United States Patent
Cremin et al.

(10) Patent No.: US 9,654,596 B2
(45) Date of Patent: May 16, 2017

(54) PROVIDING MOBILE VERSIONS OF WEB RESOURCES

(75) Inventors: Ronan Cremin, Dublin (IE); Trey Harvin, Dublin (IE); Francesco Cetraro, Malmoe (SE); Huw Spiers, Dublin (IE)

(73) Assignee: Afilias Technologies Limited, Dublin (IE)

( * ) Notice: Subject to any disclaimer, the term of this patent is extended or adjusted under 35 U.S.C. 154(b) by 0 days.

(21) Appl. No.: 13/640,882

(22) PCT Filed: Apr. 14, 2011

(86) PCT No.: PCT/EP2011/055959
§ 371 (c)(1),
(2), (4) Date: Nov. 25, 2013

(87) PCT Pub. No.: WO2011/128417
PCT Pub. Date: Oct. 20, 2011

(65) Prior Publication Data
US 2014/0304370 A1  Oct. 9, 2014

(30) Foreign Application Priority Data
Apr. 14, 2010  (GB) .................................. 1006229.7

(51) Int. Cl.
| G06F 15/16 | (2006.01) |
| H04L 29/08 | (2006.01) |
| G06F 17/30 | (2006.01) |

(52) U.S. Cl.
CPC ........ H04L 67/32 (2013.01); G06F 17/30905 (2013.01); *G06F 17/30899* (2013.01); *H04L 67/02* (2013.01); *H04L 67/04* (2013.01)

(58) Field of Classification Search
CPC ... H04L 67/04; H04L 67/02; G06F 17/30905; G06F 17/30899

(Continued)

(56) References Cited

U.S. PATENT DOCUMENTS 8,201,081 B2*  6/2012  Stroe et al. .................... 715/234
2002/0178234 A1* 11/2002  Birchley ........... H04L 29/12009
                                                          709/217

(Continued)

FOREIGN PATENT DOCUMENTS

| EP | 1271877 | 1/2003 | |
| IE | GB 2464313 A * | 4/2010 | ....... G06F 17/30905 |
| WO | WO 2006/091154 | 8/2006 | |

OTHER PUBLICATIONS

Search Report for United Kingdom Patent Application No. GB1006229.7, dated Aug. 12, 2010, 3 pages.

(Continued)

*Primary Examiner* — Alicia Baturay
*Assistant Examiner* — Joseph Maniwang
(74) *Attorney, Agent, or Firm* — Sheridan Ross P.C.

(57) ABSTRACT

A transcoding system (1) comprises a mobile communication device (2) that retrieves a web resource using a mobile communication network (3) and the internet (4) via a transcoder (5). The web resource may comprise a web page specifically encoded for the mobile communication device (2). To locate the web page, the mobile communication device (2) sends a request comprising an internet domain name having a top level domain and one or more other elements. The transcoder (5) generates further internet domain names that share the one or more further elements. The transcoder (5) then determines which of the web resources identified by the one or more further internet domain names is most appropriate for the mobile communication device (2) and provides this web resource to the mobile communication device (2).

16 Claims, 2 Drawing Sheets

(58) Field of Classification Search
USPC .................................................. 709/203, 246
See application file for complete search history.

(56) References Cited

U.S. PATENT DOCUMENTS

| | | |
|---|---|---|
| 2004/0068579 A1* | 4/2004 | Marmigere et al. .......... 709/242 |
| 2008/0033998 A1* | 2/2008 | Rao ................... G06F 17/30864 |
| 2009/0024698 A1* | 1/2009 | Ho et al. ........................ 709/203 |
| 2009/0094677 A1* | 4/2009 | Pietraszek et al. ................ 726/2 |
| 2010/0114879 A1* | 5/2010 | Zhong et al. ................. 707/723 |
| 2011/0004850 A1* | 1/2011 | Lodico et al. ................. 715/838 |

OTHER PUBLICATIONS

Nokia: "Top-Level Domain for Mobile", 3GPP Draft; SP-020123, $3^{rd}$ Generation Partnership Project (3GPP), Mobile Competence Centre; 650, Route Des Lucioles; F-06921 Sophia-Antipolis Cedex; France, vol. TSG SA, no. Cheju; Mar. 8, 2002.

Smith, J.R. et al.; "Transcoding Internet content for heterogeneous client device", Circuits and Systems, 1998. ISCAS '98. Proceedings of the 1998 IEEE International Symposium on Monterey, CA, USA; May 31-Jun. 3, 1998, New York, NY.

International Search Report prepared by the European Patent Office on Jun. 6, 2011, for International Application No. PCT/EP2011/055959.

Written Opinion prepared by the European Patent Office on Jun. 6, 2011, for International Application No. PCT/EP2011/055959.

* cited by examiner

PROVIDING MOBILE VERSIONS OF WEB RESOURCES

CROSS REFERENCE TO RELATED APPLICATIONS

This application is a national stage application under 35 U.S.C. 371 of PCT Application No. PCT/EP2011/055959 having an international filing date of 14 Apr. 2011, which designated the United States, which PCT application claimed the benefit of Great Britain Application No. 1006229.7 filed 14 Apr. 2010, the entire disclosure of each of which is incorporated herein by reference.

FIELD OF THE INVENTION

The present invention relates to the identification of web resources suitable for use by mobile communication devices. In particular, but not exclusively, the invention has application in ensuring that the most appropriate web resources are provided to mobile communication devices.

BACKGROUND TO THE INVENTION

Most web resources are intended for use by desktop and laptop personal computers (PCs). This means that they are often unsuitable for use by mobile communication devices. Web resources, typically web sites and web pages, may include script, graphics, images, animations, video data, audio data, layouts etc. that are not supported by a mobile communication device. For example, a web site may include objects encoded using Java® or Adobe® Flash script, but a mobile communication device may not have the correct software to use such objects. Similarly, an image on a web site may be too large to be displayed on a mobile communication device.

It is known to convert web resources intended for use by PCs to be suitable for use by mobile communication devices. This conversion is known as transcoding and is often carried out by mobile network operators. When the user of a mobile communication device seeks access to a given web resource via the mobile communication network, instead of the mobile communication device being provided with the web resource itself, it is provided with a transcoded version of the web resource.

In more detail, the mobile communication device may send a request for a web resource, which request includes an internet domain name, e.g. "bobspizzashop.com". The mobile network retrieves the web resource from the web server using the internet domain name (or, more specifically, an Internet Protocol (IP) address for the server at which the web resource is located, which IP address can be retrieved from the Domain Name System (DNS) of the internet using the internet domain name). However, instead of delivering the web resource straight to the mobile communication device, the operator of the mobile network first transcodes the web resource.

Typically, the transcoding involves identifying the type of mobile communication device that made the request and adapting the web resource to be suitable for that device. For example, if the web resource is encoded using script that is not supported by the type of mobile communication device, the web resource may be converted to script that is supported by the type of mobile communication device. Similarly, an image included in the web resource may be resized to suit the limitations of the display of the mobile communication device.

Transcoding of web resources in this way faces some difficulties. In particular, as the initial web resources are designed without the subsequent transcoding process in mind, the results can be variable and imperfect. For example, the transcoded web resource may vary according to the mobile network operator which carried out the transcoding. The owner of the initial web resource therefore has little control over the user experience when accessing the web resource via a mobile communication device. This is clearly undesirable from the perspective of the owner of the web resource.

In view of the above, many web resources are specifically encoded for use by mobile communication devices. Usually, web resources specifically encoded for use by mobile communication devices are based on web resources intended for use by PCs. For example, an organisation may have two web sites, one for use by PCs and the other specifically encoded for use by mobile communication devices. This allows the owner of the web resources to control the user experience even when the web resources are accessed on a mobile communication device.

However, the provision of separate web resources that are specifically encoded for use by mobile communication devices is only effective if the users of mobile communication devices are able to access them. For example, where a company has two web sites, one for use by PCs and the other specifically encoded for use by mobile communication devices, the mobile communication device must access the correct web site if it is to make use of the web resources that have been specifically encoded for it. However, there is currently no predictable way in which a user may be alerted as to the presence or otherwise and location of web resources specifically encoded for mobile communication devices.

The complexity of the above difficulties is increased by the variety of capabilities of different mobile communication devices. The owner of a web resource may wish to provide separate versions of that resource specifically encoded for different types of mobile communication device which will access the resource. However, providing a large variety of web resources makes even more difficult for users to locate the appropriate resource for their mobile communication device. As a result, owners of web resources are typically hesitant to make the necessary investment to optimise those web resources for each type of mobile communication device. This leads to a limited user experience.

SUMMARY OF THE INVENTION

According to a first aspect of the present invention, there is provided a method for providing a mobile specific web resource to a mobile communication device, the method comprising:

receiving a request from the mobile communication device, the request including a first internet domain name comprising a top level domain and one or more further elements;

generating further internet domain names comprising the one or more further elements;

retrieving web resources identified by the one or more further internet domain names;

analysing the web resources to determine which is most appropriate for delivery to a mobile communication device; and delivering the most appropriate web resource to the mobile communication device.

According to a second aspect of the present invention, there is provided an apparatus for providing a mobile specific web resource to a mobile communication device, the apparatus comprising a server for:

receiving a request from the mobile communication device, the request including a first internet domain name comprising a top level domain and one or more further elements;

generating further internet domain names comprising the one or more further elements;

retrieving web resources identified by the one or more further internet domain names;

analysing the web resources to determine which is most appropriate for delivery to a mobile communication device; and delivering the most appropriate web resource to the mobile communication device.

So, the first and second aspects of the present invention can assist in the identification and subsequent delivery of web resources that are appropriate for a mobile communication device. An initial request may be made using a first internet domain name which contains a top level domain. This top level domain may be removed and further internet domain names containing at least some of the remaining elements of the first internet domain name may be generated. Web resources identified by these generated internet domain names may be retrieved where possible and then analysed to determine which of these is most appropriate for the mobile communication device. This allows web resources that are appropriate for mobile communication devices to be identified and delivered to the mobile communication device.

For example, a web resource owner may have established a web page designed for PCs hosted at an IP address associated with internet domain name "bobspizzashop.com" and a version of this web page specifically encoded for mobile communication devices hosted at an IP address associated with internet domain name "mobile.bobspizzashop.com". In this example, a mobile communication device may send a request including a first internet domain name "bobspizzashop.com.mobi". By generating further internet domain names that contain the string "bobspizzashop", both the internet domain name "bobspizzashop.com" and the internet domain name "mobile.bobspizzashop.com" may be identified, and the web pages hosted the IP addresses associated with these addresses may be retrieved. It may then be determined that the web page hosted at the IP address associated with the internet domain name "mobile.bobspizzashop.com" is the most appropriate for the mobile communication device, and this web page may be delivered to the mobile communication device.

Preferred embodiments of the present invention allow the mobile communication device to request internet domain names having a particular top level domain, such as ".mobi", in the knowledge that this will cause the server to determine the most appropriate web resource for the mobile communication device. For example, in preferred embodiments a particular top level domain, such as ".mobi", may be suffixed to existing internet domain names in order to cause the server to determine the most appropriate web resource for the mobile communication device.

Preferably, the first internet domain name and the one or more further internet domain names have different top level domains but the same main distinctive label. For instance, in the example given above, the main distinctive label is "bobspizzashop". This is relatively memorable for a user, who does not need to remember other aspects of the internet domain name at which the web resources designed for the mobile communication device are hosted in order to access them.

Preferably, the first internet domain name is mapped to the IP address of the most appropriate web resource. For example, the first internet domain name may be stored together with an IP address of the most appropriate web resource. This allows the determined web resource to be delivered when subsequent requests are received including the first internet domain name without the requirement to repeat the steps of generating one or more further internet domain names comprising the one or more further elements; retrieving one or more web resources identified by the one or more further internet domain names; and analysing the one or more web resources to determine which is most appropriate for delivery to the mobile communication device.

Referring again to the example given above, it may be that the web resources hosted at internet domain name "mobile.bobspizzashop.com" are imperfectly designed for the specific mobile communication device that has made the request. Alternatively, the web site owner may have only provided a web site for PCs, such as that hosted at internet domain name "bobspizzashop.com". For this reason, the server may be a transcoder. In such circumstances, it is preferable that the most appropriate web resource is transcoded before being delivered to the mobile communication device.

Preferably, the transcoded web resource is stored. This allows the transcoded web resources to be delivered at a later date without the requirement for transcoding step to occur again. In preferred examples, the transcoded web page is stored for a predetermined period of time. As such, changes in the most appropriate web resource are reflected in the transcoded web resource delivered to the mobile communication device after this period expires.

According to a third aspect of the present invention, there is provided a method of providing a mobile specific web resource to a mobile communication device, the method comprising receiving a request from a mobile communication device, the request including a first internet domain name comprising a top level domain and one or more further elements;

generating a truncated internet domain name by removing the top level domain from the first internet domain name;

retrieving a web resource identified by the truncated internet domain name;

analysing the retrieved web resource to determine whether it is appropriate for the mobile communication device;

transcoding the web resource if it is not appropriate for the mobile communication device; and delivering the web resource to the mobile communication device.

According to a fourth aspect of the present invention, there is provided an apparatus for providing a mobile specific web resource to a mobile communication device, the apparatus comprising a server for:

receiving a request from a mobile communication device, the request including a first internet domain name comprising a top level domain and one or more further elements;

generating a truncated internet domain name by removing the top level domain from the first internet domain name;

retrieving a web resource identified by the truncated internet domain name;

analysing the retrieved web resource to determine whether it is appropriate for the mobile communication device;

transcoding the web resource if it is not appropriate for the mobile communication device; and delivering the web resource to the mobile communication device.

So, the third and fourth aspects of the present invention can also assist in the identification and subsequent delivery of web resources that are appropriate for a mobile communication device. In particular, a request from a mobile communication device can use a first internet domain name made up of a truncated internet domain name and a top level domain, wherein the truncated internet domain name identifies a known web resource. When the request is received, the truncated internet domain name may be generated by removing the top level domain, the web resource may then be retrieved and analysed, and the web resource may then be transcoded in dependence on this analysis. That is, the web resource can be transcoded after an assessment has been made of whether this is necessary.

Use of the words "apparatus", "transcoder" and so on are intended to be general rather than specific. Whilst these features of the invention may be implemented using an individual component, such as a computer or a central processing unit (CPU), they can equally well be implemented using other suitable components or a combination of components. For example, the invention could be implemented using a hard-wired circuit or circuits, e.g. an integrated circuit, or using embedded software. It can also be appreciated that the invention can be implemented, at least in part, using computer program code. According to another aspect of the present invention, there is therefore provided computer software or computer program code adapted to carry out the method described above when processed by a computer processing means. The computer software or computer program code can be carried by computer readable medium. The medium may be a physical storage medium such as a Read Only Memory (ROM) chip. Alternatively, it may be a disk such as a Digital Video Disk (DVD-ROM) or Compact Disk (CD-ROM). It could also be a signal such as an electronic signal over wires, an optical signal or a radio signal such as to a satellite or the like. The invention also extends to a processor running the software or code, e.g. a computer configured to carry out the method described above.

A preferred embodiment of the invention is described below, by way of example only, with reference to the accompanying drawings.

DETAILED DESCRIPTION OF THE PREFERRED EMBODIMENT

Figure 1:
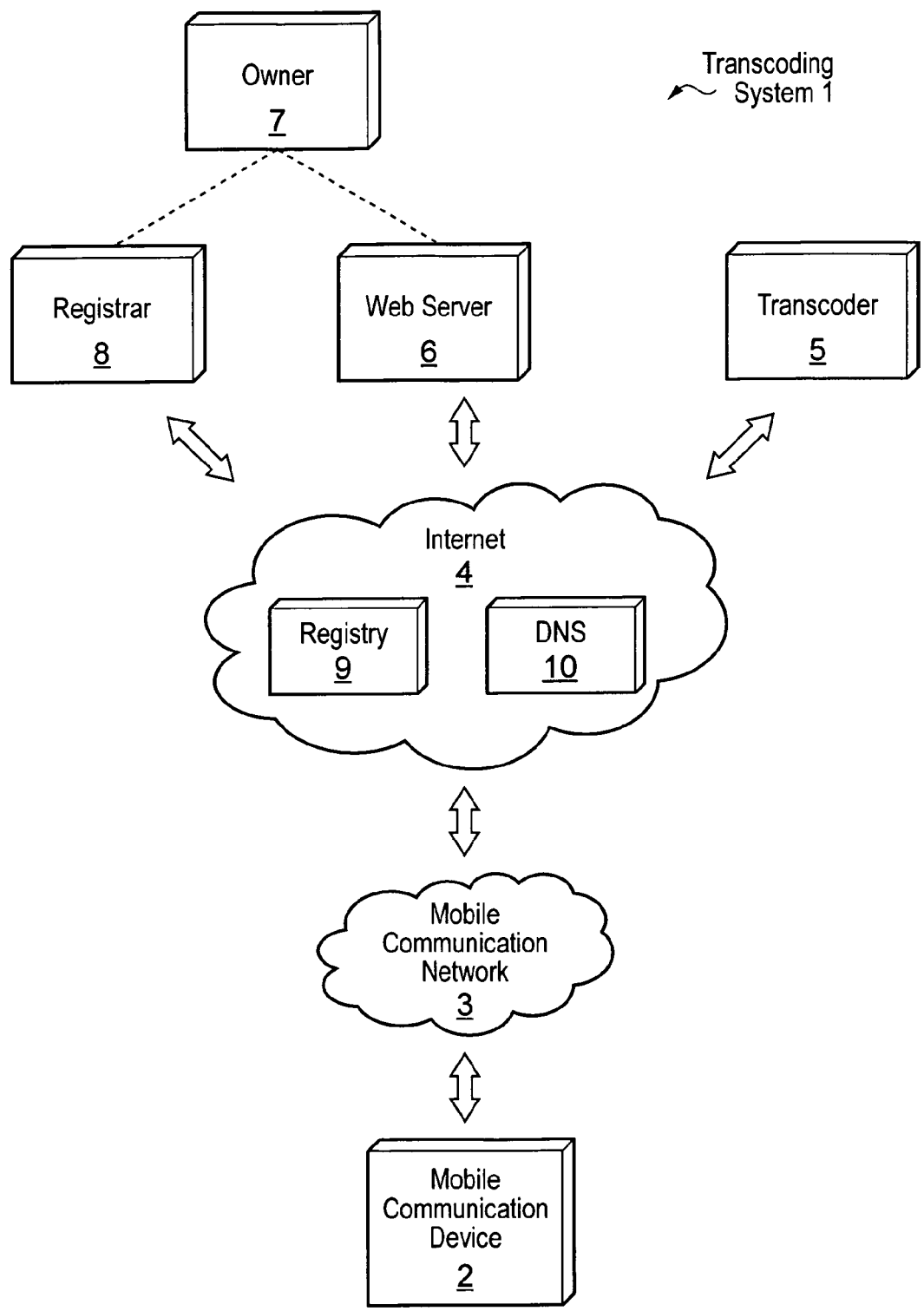
FIG. 1 is a schematic diagram of a transcoding system.

Referring to FIG. 1, a transcoding system 1 comprises a mobile communication device 2, such as a mobile telephone, smart phone, Personal Digital Assistant (PDA) or such like, that retrieves a web resource using a mobile communication network 3 and the internet 4 via a transcoder 5. The mobile communication network 3 is typically a terrestrial or satellite mobile communication network. In other examples, the mobile communication device 2 uses a Wireless Local Area Network (WLAN) or such like to connect to the internet 4 instead of the mobile communication network 3. The mode of connection to the internet 4 is inessential, but the mobile communication device 2 itself is usually characterised by limitations in its ability to use web resources intended for use by desktop and laptop personal computers (PCs).

Web resources include web sites, web pages, feeds, data or video files and so on. In the illustrated example, a web page intended for use by PCs is stored at a web server 6. The web page is part of a web site under the control of a web site owner 7. In this example, the web server 6 is also under the control of the web site owner 7, but in other examples, the web server 6 may be controlled by another party, such as an Internet Service Provider (ISP), on behalf of the web site owner 7.

A registrar 8 is responsible for registering new internet domain names with an internet domain name registry 9, which for simplicity is considered to be part of the internet 4 in FIG. 1. In this example, the registry 9 is responsible for the generic top level domain (TLD) ".mobi" and the registrar 8 handles requests by registrants to register internet domain names with the ".mobi" TLD.

The registrar may offer various services to the web site owner 7 in exchange for the registration at the registry 9 of an internet domain name having the TLD ".mobi". However, for the purposes of illustrating the present invention, it is not necessary that the web site owner 7 and the registrar 8 enter into such an arrangement.

Instead, the registrar 8 generates a variety of new internet domain names having ".mobi" as the TLD and another element as the second level domain. These other elements used as second level domains are typically those known for use as top level domains for existing web resources. For example, the registrar 8 may generate "com.mobi", where "corn" is the second level domain and ".mobi" is the top level domain. Other domain names that the registrar 8 may generate can include "uk.mobi", "org.mobi", "info.mobi" and so on. In general the registrar generates domain names that use existing generic top level domains (gTLDs), such as ".com", ".info", ".co" and so on, as the second level domain and ".mobi" as the top level domain.

The registrar 8 then registers these domain names with the registry 9. Specifically, the registrar 8 then sends requests to the registry 9 to create resource records for the new internet domain names. In this example, the registrar 8 sends <create> requests using Extensible Provisioning Protocol (EPP), as described in the Network Working Group Request for Comments (RFC) 4930 that can be found at http://tools.ietf.org/html/rfc4930. The EPP <create> requests map the new internet domain names, such as "com.mobi", to the Internet Protocol (IP) address of the transcoder 5. This mapping of the new internet domain names to the IP address of the transcoder 5 propagates throughout the domain name system (DNS) 10 of the internet through the exchange of zone files as explained at www.dns.net.

The new internet domain names are mapped to the IP address of the transcoder 5 in the DNS 10 of the internet in such a manner that the addition of lower level domains to the new internet domain names does not change this mapping. For example, where the new internet domain name is "com.mobi", any internet domain name of the form "*.com.mobi", where "*" is a wildcard which may represent any allowable internet domain name element, is mapped to the transcoder 5.

Preferably, new internet domain names which use the majority of or even all existing gTLDs as a second level domain in combination with ".mobi" as a TLD are registered. Accordingly, when browsing the internet, a user may add ".mobi" to the end of an existing internet domain name in order to access the transcoder 5 and make use of the invention as described below.

For example, consider a web site owner 7 who has established a web page for PCs hosted at an IP address associated with internet domain name "bobspizzashop.com" and has also established a web page specifically encoded for mobile communication devices (a "mobile web page") hosted at an IP address associated with internet domain name "mobile.bobspizzashop.com". A user wishing to access the web resources belonging to the web site owner 7 on a mobile communication device 2 may be unaware of the existence of the mobile web page. Even if aware of the existence of the mobile web page, the user may not know the internet domain name of the mobile web page and may therefore be unable to access it. However, the user is aware of the internet domain name associated with the IP address at which the web page for PCs is hosted (i.e. "bospizzashop. com").

In the preferred embodiment of the present invention, the user may discover the existence and location of a mobile web page by adding the ".mobi" top level domain to the known internet domain when browsing. That is, the user of the mobile communication device 2 may browse to "bobspizzashop.com.mobi". Moreover, if no mobile web page exists, the user of the mobile communication device 2 may use the same technique, i.e. browsing to "bobspizzashop.com.mobi" to access a transcoded version of the web page for PCs at "bobspizzashop.com". This transcoded version of the web page for PCs is adapted so as to be suitable for the mobile communication device 2.

Figure 2:
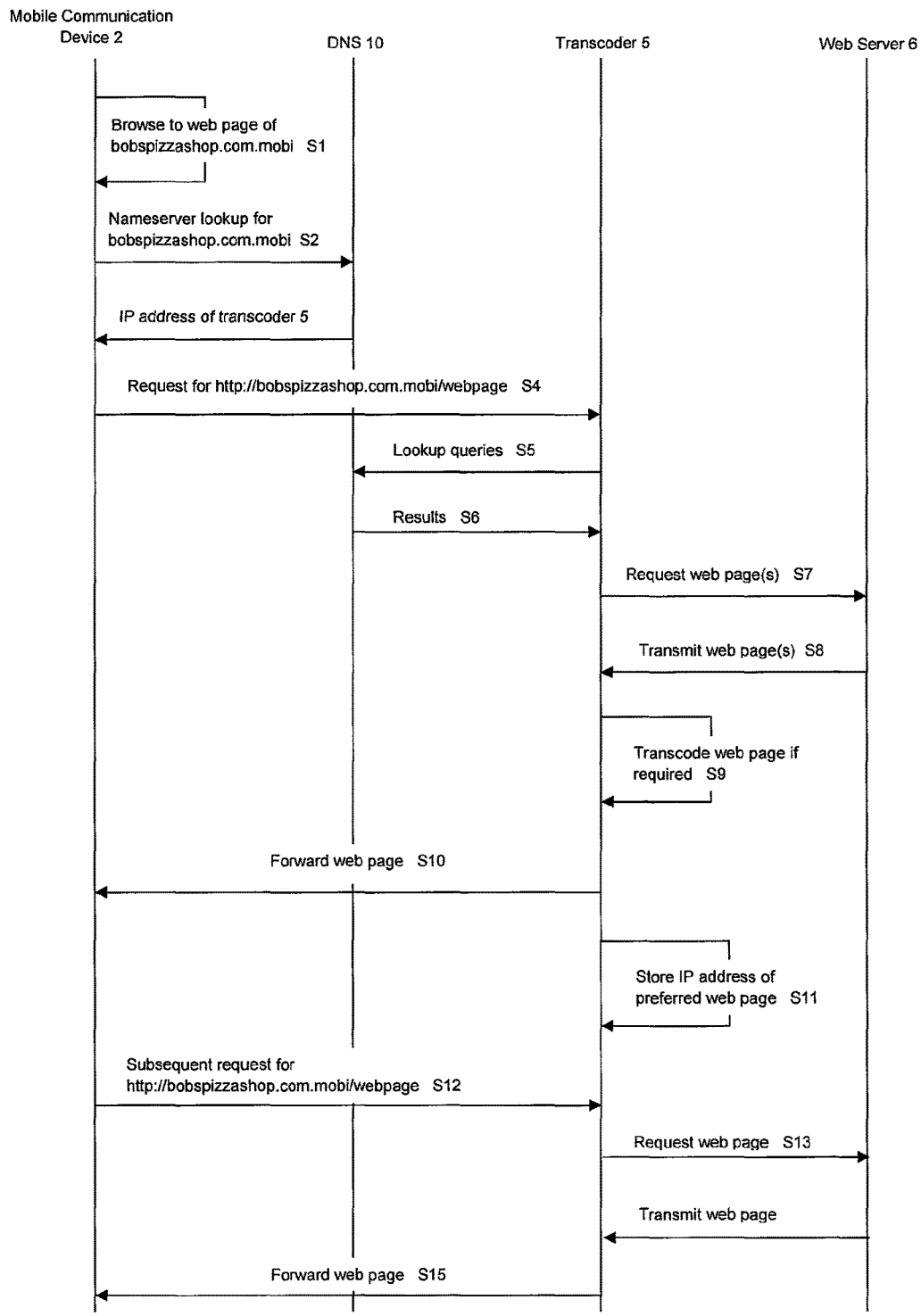
FIG. 2 is a sequence diagram illustrating use of the transcoding system.

Referring to FIG. 2, at step S1 the mobile communication device 2 browses to a web page at an internet domain name having the ".mobi" top level domain, e.g. "bobspizzashop.com.mobi". Assuming the mobile communication device 2 does not know the IP address associated with the internet domain name "bobspizzashop.com.mobi", this initiates a lookup query to the DNS 10, at step S2. The DNS 10 provides the IP address of the transcoder 5 to the mobile communication device 2 at step S3. Using this IP address, the mobile communication device 2 sends a HyperText Transfer Protocol (HTTP) request to the transcoder 5 for the web page, e.g. using Uniform Resource Locator (URL) "http://bobspizzashop.com.mobi/webpage", at step S4.

The transcoder then 5 generates further internet domain names using the internet domain name "bobspizzashop.com.mobi". In particular, the transcoder 5 generates a truncated internet domain name by removing the top level domain name, i.e. ".mobi", thereby leaving the internet domain name associated with the PC web page, i.e. "bobspizzashop.com". The transcoder may additionally generate a number of potential internet domain names based on the truncated internet domain name. For example, the transcoder may generate potential internet domain names "m.bobspizzashop.com" and "mobile.bobspizzashop.com". The potential internet domain names typically share the main distinctive element (in this case, "bobspizzashop") with the truncated internet domain name and the internet domain name used in the request sent by the mobile communication device 2, while they may add or remove other elements to or from the truncated internet domain name.

At step S5, the transcoder 5 initiates lookup queries to the DNS 10 for the further internet domain names it has generated, i.e. the truncated internet domain name and the potential internet domain names. For example, the transcoder 5 may initiate lookup queries for "bobspizzashop.com", "m.bobspizzashop.com" and "mobile.bobspizzashop.com".

At step S6, the DNS 10 provides the results of the lookup queries to the transcoder 5. These will include the IP address associated with the PC web page at the truncated internet domain name "bobspizzashop.com" as well any IP addresses that are associated with the potential internet domain names. It is likely that not all of the prospective internet domain names used in the lookup queries will have a validly assigned IP address, in which case the DNS 10 returns either no result or a conventional error message for these internet domain names.

Using the IP addresses received from the DNS 10, the transcoder 5 sends HyperText Transfer Protocol (HTTP) requests, at step S7, to the web server 6 for web pages using Uniform Resource Locator (URLs) based on the truncated internet domain name and the potential internet domain names, such as "http://bobspizzashop.com/webpage", "http://mobile.bobspizzashop.com/webpage", "http://m.bobspizzashop.com/webpage", "http://bobspizzashop.com/mobile" and so on. Although a single web server 6 is illustrated in FIG. 2, the skilled person will appreciate that different web pages may be hosted by different web servers. The IP addresses received by the transcoder 5 allow it to direct its request to the correct web server(s).

The web server 6 then returns the requested web pages to the transcoder 5, at step S8. These will include at least the PC web page associated with internet domain name "bobspizzashop.com" and may include other web pages which the transcoder 5 has located, which may or may not be optimised for use by mobile communication device 2. The transcoder 5 analyses the returned web pages to determine which is the most appropriate for delivery to the mobile communication device 2. In the example described above, the web page identified by internet domain name "bobspizzashop.com" is designed for viewing on a PC, while the web page identified by internet domain name "mobile.bobspizzashop.com" is designed for viewing on the mobile communication device 2. It is therefore preferable to deliver the web page from "mobile.bobspizzashop.com" to the mobile communication device 2, instead of that from "bobspizzashop.com".

There may be multiple web pages designed for mobile communication devices 2. For example, a first mobile web page designed for mobile communication devices 2 may be stored at an address associated with internet domain name "mobile.bobspizzashop.com" and a second web page designed for mobile communication devices 2 may be stored at an address associated with internet domain name "m.bobspizzashop.com". In this case, the transcoder 5 will determine which of the web pages designed for mobile communication devices 2 is most appropriate for the particular mobile communication device that made the original request.

In some cases, it may be desirable to transcode the web page determined as most suitable for the mobile communication device 2. This may be because none of the identified web pages are designed for mobile communication devices in general (for example, if the mobile web site at internet domain name "mobile.bobspizzashop.com" did not exist), or because they have not been optimised for the particular mobile communication device 2 that made the initial request at step S1. At step S9, the transcoder 5 transcodes the determined web page if required.

The web page determined to be most appropriate for the mobile communication device is then returned to the mobile communication device, at step S10. As explained above, the web page returned to the mobile communication device may or may not have been transcoded by the transcoder 5.

It is notable that the transcoder 5 has now established which internet domain name associated with "bobspizzashop.com.mobi" provides the most appropriate web page for the mobile communication device 2. In order to avoid duplication of effort, and to reduce lag times in future, at step S11, the transcoder 5 stores this information. That is, the transcoder 5 maps the internet domain name "bospizzashop.com.mobi" to the address of the most appropriate web page. The transcoder 5 may also store the most appropriate web page itself. The transcoded version of the web page may also be stored. As such, future requests for "bobspizzashop.com.mobi" are dealt with more efficiently without the requirement to identify IP addresses by trying a variety of lookup queries at the DNS 10. This is described below with reference to steps S12 to S15.

At step S12 a subsequent request for "bobspizzashop.com.mobi" is made. For clarity, this subsequent request is indicated coming from the mobile communication device 2 which made the initial request at step S1, although in practice it could originate with a different mobile communication device. On receiving the request, the transcoder 5 recognises the internet domain name "bobspizzashop.com.mobi" as this information has been saved by the transcoder 5 at step S11. The transcoder 5 has also saved the URL of the web page which was determined to be most appropriate for delivery to the mobile communication device 2. Accordingly, the transcoder 5 may use this information to request the most appropriate web page from the web server 6, at step S13. The web server 6 returns the web page to the transcoder 5, at step S14, and this is subsequently forwarded to the mobile communication device, at step S15.

If the web page has been previously transcoded by transcoder 5, then there is no need for the transcoder 5 to obtain the web page from the web server 6 again (steps S13 and S14). In these circumstances, the transcoded web page is simply returned to the mobile communication device 2 from the transcoder 5.

Information may be stored by the transcoder for a limited period to ensure that content delivered to the mobile communication device 2 reflects the current state of the web page itself. For example, transcoded web resources may be stored for a week, a day, or any other appropriate time period. The appropriate time period may vary according to the type of content reflected by the web page. For example, a web page relating to breaking news may be expected to be updated regularly, meaning that it would only be appropriate to store a transcoded version of this web page for a short period, if at all.

The described embodiments of the invention are only examples of how the invention may be implemented. Modifications, variations and changes to the described embodiments will occur to those having appropriate skills and knowledge. These modifications, variations and changes may be made without departure from the scope of the invention defined in the claims and its equivalents.

The invention claimed is:

1. A method of providing a mobile specific web resource to a mobile communication device, the method comprising:
    receiving a request from a mobile communication device, the request including a first internet domain name comprising a top level domain and one or more further elements;
    generating further internet domain names each including at least one of the one or more further elements;
    retrieving web resources identified by the further internet domain names;
    analysing the retrieved web resources;
    selecting one of the web resources based on the analysis; and
    delivering the selected web resource to the mobile communication device as the mobile specific web resource.

2. The method of claim 1, wherein the further internet domain names additionally include elements including at least one of: "m", "mobile" and "mob".

3. The method of claim 2, wherein analysing the web resources comprises comparing the web resources.

4. The method of claim 2, comprising transcoding the selected web resource before delivering it to the mobile communication device.

5. The method of claim 2, wherein the first internet domain name and the one or more further internet domain names have different top level domains but the same main distinctive label.

6. The method of claim 2, further comprising the step of mapping the first internet domain name to an address of the selected web resource.

7. The method of claim 1, wherein analysing the web resources comprises comparing the web resources.

8. The method of claim 7, comprising transcoding the selected web resource before delivering it to the mobile communication device.

9. The method of claim 7, wherein the first internet domain name and the one or more further internet domain names have different top level domains but the same main distinctive label.

10. The method of claim 1, comprising transcoding the selected web resource before delivering it to the mobile communication device.

11. The method of claim 10, further comprising the step of storing the transcoded web resource.

12. The method of claim 11, wherein the transcoded web resource is stored for a pre-determined period of time. selected web resource before delivering it to the mobile communication device.

13. The method of claim 10, wherein the first internet domain name and the one or more further internet domain names have different top level domains but the same main distinctive label.

14. The method of claim 1, wherein the first internet domain name and the one or more further internet domain names have different top level domains but the same main distinctive label.

15. The method of claim 1, further comprising the step of mapping the first internet domain name to an address of the selected web resource.

16. A method of providing a mobile specific web resource to mobile communication devices, the method comprising:
    receiving a request from a first mobile communication device, the request including a first internet domain name comprising a top level domain and one or more further elements;
    generating further internet domain names each including at least one of the one or more further elements;
    retrieving web resources identified by the further internet domain names;
    analysing the retrieved web resources;
    selecting one of the web resources based on the analysis;
    delivering the selected web resource to the first mobile communication device as the mobile specific web resource;
    storing a mapping of the first internet domain name to the further internet domain name identifying the selected web resource;
    receiving a subsequent request from a further mobile communication device, the request including the first internet domain name;

using the stored mapping to map the first internet domain name to the further internet domain name identifying the selected web resource;

retrieving the web resource identified by the further internet domain name identifying the selected web resource; and delivering the selected web resource to the further mobile communication device as the mobile specific web resource.

\* \* \* \* \*